July 18, 1950

C. I. HALL 2,515,771

POLARIZED RELAY AND MOTOR CONTROL SYSTEM

Filed May 11, 1945

Inventor:
Chester I. Hall,
by Harry E. Dunham
His Attorney.

Patented July 18, 1950

2,515,771

UNITED STATES PATENT OFFICE 2,515,771

POLARIZED RELAY AND MOTOR CONTROL SYSTEM

Chester I. Hall, Vischer's Ferry, N. Y., assignor to General Electric Company, a corporation of New York Application May 11, 1945, Serial No. 593,213

14 Claims. (Cl. 318—28)

The invention relates to polarized relays and more particularly to an improved magnetic trigger action form of electromagnetically controlled sensitive snap action selective 3-position polarized relay adapted for selective circuit control such as required in automatic temperature regulating or condition modulating or other control service and also capable of resisting severe vibration conditions.

The present invention provides further improvements in the trigger action electromagnetic polarization-unbalancing control power amplifying invention of my prior application, Serial No. 471,739, filed January 8, 1943, issued on July 16, 1946, as Patent No. 2,404,227.

The principal object of the present invention is to obtain greater sensitivity and selective electromagnetic unbalancing control power amplification by means of an improved magnetic structure for differentially interlinking a polarizing and an unbalancing flux path through a centrally pivoted reversely tilting 3-position magnetic flux conducting member.

A particular object is to utilize more effectively the differential or opposite variations in reluctance of a pair of oppositely variable magnetic attraction air gaps at the opposite ends of the centrally pivoted reversely tilting magnetic flux conducting member by magnetically interlinking a polarizing magnetic circuit with the member through the two magnetic attraction air gaps in series and a magnetic unbalancing control electromagnet with the member through the two magnetic attraction air gaps in parallel so as to shunt the polarizing magnetic circuit adjacent the pivot axis of the tilting member.

A further object is to adjustably counterbalance the reversely variable magnetic biasing force acting upon the tilting magnetic member by means of compound sequentially acting resilient biasing springs so that each can be separately adjusted and thereby enable each "pick up" and "drop out" excitation of the 3-position relay to be separately adjusted.

Another object is to enable a part of the compound adjustable counterbalancing springs to provide a resilient wiping of the relay switching contacts after the sensitive snap action tilting of the magnetic actuating member occurs so as to resist accidental opening of the contacts under severe vibration conditions.

A still further object is to provide a polarized magnetic structure of improved permeability and magnetic efficiency with a separately excited control pole centrally disposed between a magnetically balanced pair of opposite poles and with a reversely tilting magnetic flux conducting member centrally pivoted adjacent the control pole and biased to provide a pair of oppositely variable magnetic attraction air gaps between the opposite ends of the tilting member and the opposite poles for controlling the tilting of the member in response to variations in the excitation of the control pole.

More specific objects are to fix the separately excited control pole piece centrally between the oppositely polarized pole pieces in permanent spaced alignment so as to magnetically balance the opposite poles at the opposite ends of the tilting magnetic member and to complete the polarizing and control magnetic circuits by removable magnetic flux conducting means joining all the pole pieces together and particularly adapted for removably mounting a pair of opposed magnetizing windings on the central control pole piece and a normally energized polarizing winding on each of the opposite pole pieces.

Other objects and advantages of the invention will appear in the claims and in the description of the accompanying drawings in which

In the drawings, Figs. 1, 2, 3, and 4 reveal the preferred detailed construction of the polarized relay of the present invention which is indicated generally by the reference character 10. A polar structure for the polarized magnetic circuit of relay 10 is formed by two magnetic pole pieces 11 and 12, preferably of high permeability material, and preferably disposed in diverging spaced apart alignment to minimize the length and therefore the reluctance of the circuit and carrying respectively the polarizing windings 13 and 14 adjacent the opposing bent-over polar ends 11a and 12a thereof. The polarizing windings 13 and 14 are both normally energized, preferably in a series circuit as shown, so as to provide a pair of balanced poles of opposite polarity at the bent-over polar ends 11a and 12a of the magnetic pole pieces 11 and 12. This polar structure constitutes in effect a pair of cumulative or additive polarizing electromagnets in the polarizing magnetic circuit of relay 10. The other ends of the pole pieces 11 and 12 are magnetically interconnected by means of a U-shaped magnetic member 15, also of high permeability material, that is removably clamped in good magnetic conducting relation with the pole pieces 11 and 12 by means of the holding screws 16.

The opposing bent-over ends 11a and 12a provide a pair of large area opposite poles in the relay polarized magnetic circuit. These poles 11a and 12a are mounted in fixed spaced apart alignment on the nonmagnetic supporting bracket 17, preferably by welding thereto. The supporting bracket 17 preferably is provided with a pair of upturned lugs 18 to facilitate the mounting of the entire relay magnetic structure as a unit on the base 19, preferably of insulating material, by means of the mounting screws 20.

A central magnetic balancing and unbalancing control pole 22 is mounted on the nonmagnetic supporting bracket 17 midway between the opposite poles 11a and 12a and preferably is welded to the bracket 17 so that the faces of all three cooperating poles of relay 10 can be accurately finished in a plane by grinding and maintained in a predetermined permanent spaced alignment. The center control pole 22 is magnetically connected through the core 23 to the center of the removable magnetic U-shaped member 15 by means of the clamping bolt 24. Both control pole 22 and core 23 are formed of high permeability material and located symmetrically midway between the diverging pole pieces 11 and 12 so as to balance the leakage reluctance therebetween.

Figure 4:
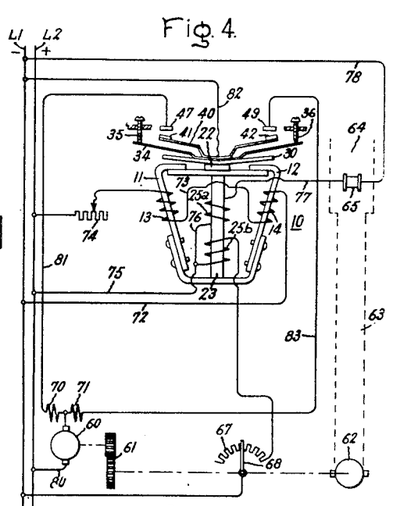
Fig. 4 is a circuit connection diagram showing schematically the improved relay of Fig. 1 connected for automatic operation in temperature modulating service under the control of a temperature responsive resistor having a negative temperature coefficient.

The magnetic unbalancing control pole 22 is separately excited by means of suitable magnetizing windings 25 carried on core 23, preferably in the form of a pair of opposing separately controllable magnetizing windings 25a and 25b, as indicated in Fig. 4. Thus the control pole 22 can selectively magnetically unbalance the opposite poles 11 and 12 responsively to the excitation of control pole 22 upon magnetizing predominance of each of the excitation control windings 25a and 25b over the other. Preferably to increase the magnetic efficiency, the opposing control magnetizing windings 25a and 25b are concentrically wound with the inner control winding 25a energized through the energizing leads 26 and the outer control winding 25b energized through the energizing leads 27 so as to provide substantially equal ampere turns.

Figure 1:
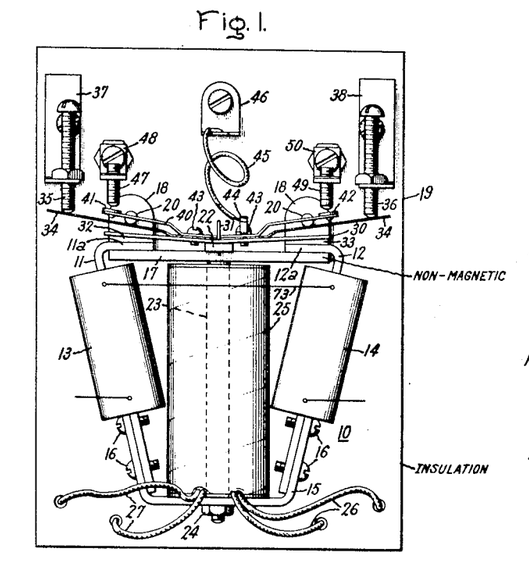
Fig. 1 is a front view of a selective 3-position snap action circuit controlling polarized relay embodying the improvements of the present invention in a preferred form.
Figure 2:
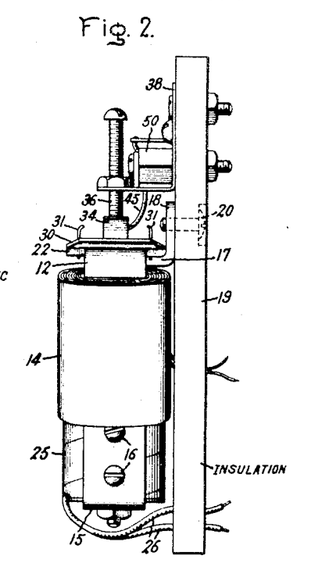
Fig. 2 is a side view of the improved relay shown in Fig. 1.
Figure 3:
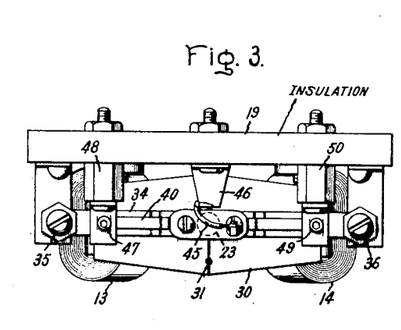
Fig. 3 is a top view of the relay of Fig. 1.

In accordance with the present invention the centrally pivoted reversely tilting magnetic flux conducting member 30 serves to differentially interlink the polarizing magnetic circuit of relay 10 with the two parallel control magnetizing circuits formed by the central pole 22 and core 23 shunting the main polarizing circuit through tilting member 30 adjacent the axis thereof. For this purpose the tilting magnetic member 30 is formed of high permeability material, preferably in a slightly dihedral shape to provide a central knife-edge pivotal mounting thereof directly on the central pole piece 22, as shown in Figs. 1 and 2. The tilting member 30 is guided by means of two guide pins 31 fixed in the central pole 22 and extending freely through suitable holes formed in the tilting member 30, as indicated in Fig. 3. In this way the tilting magnetic member 30 has a central pivot axis directly adjacent the central control pole 22 so as most effectively to utilize the pair of oppositely variable reluctance air gaps 32 and 33 provided between the opposite ends of the member 30 and the large area opposite poles 11a and 12a since these air gaps constitute the principal reluctance of the entire polarized magnetic structure.

When the tilting magnetic member 30 is substantially in its central position, as shown in Fig. 1, the two oppositely variable reluctance air gaps 32 and 33 are substantially equalized and the two opposite poles 11a and 12a aligned in the paths of the opposite ends of member 30 are balanced so as to exert substantially equal magnetic attractive forces on the opposite ends of member 30 due to substantially the same polarizing flux passing from each pole to member 30 through an equal air gap. The polarizing flux is produced by the two cumulative or additive normally energized polarizing windings 13 and 14 preferably formed of zero temperature coefficient wire to avoid the effects of temperature variations and located directly adjacent the air gaps. The polarizing flux is conducted between poles 11a and 12a by the flux conducting member 30 with the pair of oppositely variable air gaps 32 and 33 in series with magnetic member 30 at the opposite ends thereof. Preferably the total ampere turns of windings 13 and 14 are such that the polarized magnetic circuit will be maintained at or near the point of maximum permeability and consequently maximum magnetic efficiency. In this way a substantially constant polarizing flux will be circulated through the polarized magnetic circuit of relatively high permeability since the two oppositely variable air gaps 32 and 33 constitute a substantially constant reluctance in the polarized circuit.

The control electromagnet formed by pole 22, core 23, and the separately excited magnetizing windings 25a and 25b therefor, shunts the main polarizing magnetic circuit with this variably excited control shunt extending symmetrically from a point adjacent the central axis of the tilting magnetic member 30 to a point midway between the balanced opposite poles 11 and 12. In this way a highly sensitive and selective magnetic balance is established such that when either of the opposing magnetizing windings 25a and 25b slightly predominates over the other, the opposite poles 11a and 12a will become correspondingly unbalanced with the magnetic reluctance air gaps 32 and 33 in parallel in the unbalancing control magnetic circuits through tilting member 30. In this improved combination, each of the opposing magnetizing windings 25a and 25b, upon predominance thereof, oppositely excites the control pole 22 and thereby cumulatively or additively magnetizes a corresponding one of the reluctance air gaps 32 and 33 and differentially or oppositely magnetizes the other with respect to the normal polarizing magnetization thereof. As a result there is produced both an increase in flux across the air gap cumulatively magnetized by the predominating winding and a decrease in flux across the air gap differentially magnetized by the predominating magnetizing winding. The resultant differential or unbalance of the two air gap attractive forces therefor becomes effective to magnetically bias member 30 to tilt from its central position in response to very slight variations in the excitation of the control pole 22.

The improved differential magnetic unbalancing control combination of the present invention provides a marked increase in control power amplification since it effectively utilizes a combination of magnetic power amplifying laws. Thus the magnetic biasing force effective to tilt member 30 will vary substantially as the difference between the squares of the flux densities in the two air gaps 32 and 33 and the flux density in turn will vary in one gap substantially as the sum and in the other gap substantially as the difference of the polarizing magnetization and the control magnetization. Furthermore, as soon as member 30 starts to tilt each way, the effective control magnetization of the air gaps then varies as a function of the opposite variations in air gap reluctance produced by the tilting of the member 30 resulting in a marked increase in ratio of unbalance magnetic bias being developed with tilt even though the polarizing magnetization remains substantially constant. Consequently a highly sensitive as well as powerful reversible magnetic trigger action can be obtained.

In further accordance with the invention, improved compound sequentially acting resilient biasing means are provided for cooperating with the improved trigger action magnetic structure in controlling the tilting of the magnetic member 30. In the preferred form shown, one part of the sequential resilient means is the double blade spring 34 having the opposite ends thereof engaging with the separately adjustable stops 35 and 36 carried respectively on the brackets 37 and 38. The other part of the compound sequential biasing means is formed by the double blade spring 40 carrying the relay selective circuit controlling switch contacts 41 and 42 at the opposite ends thereof. Both of the double blade biasing springs 34 and 40 are secured in superimposed relation centrally to the central portion of the tilting magnetic member 30 by means of the holding down screws 43. The sequential action of these biasing springs 34 and 40 is explained hereinafter in connection with the force diagrams of Figs. 5 and 6.

It will be understood that while biasing springs 34 and 40 are illustrated and described in this preferred embodiment as single springs centrally secured to tilting magnetic member 30, that two springs may be substituted for the right and left hand portions of each of these springs if desired. The important consideration is that a pair of cumulatively acting sequential biasing means are provided for one end of member 30 and a separate pair of cumulatively acting sequential biasing means are provided for the other end of member 30. In this typical apparatus the left hand ends of springs 34 and 40 provide such a pair of means for the left hand end of member 30 while the right hand portions of springs 34 and 40 provide such a pair of means for the right hand end of member 30.

The relay switching contacts 41 and 42 are actuated by tilting magnetic member 30 to control a circuit that extends through the terminal 44 and the flexible conductor 45 to the wiring terminal 46. The resiliently supported contact 41 provides a wiping action upon engagement with the adjustable cooperating contact 47 carried on the wiring terminal 48. Likewise, the resiliently supported contact 42 provides a wiping action upon engagement with the adjustable cooperating contact 49 carried by the wiring terminal 50.

The spring stops 35 and 36 may be adjusted, as shown in Fig. 1, so as to cause the two halves of the biasing spring 34 to bias the tilting member 30 each way to its central position wherein the magnetic air gaps 32 and 33 are substantially equalized. Likewise, contacts 41 and 49 may be adjusted so that after a predetermined limited tilting of the magnetic member 30 each way from its central position the corresponding one of the moving contacts 41 or 42 will engage with its cooperating contact. Then, as the tilting continues, one blade of the contact spring 40 is stressed to provide an additional bias tending to return the magnetic member 30 towards its central position.

Figure 5:
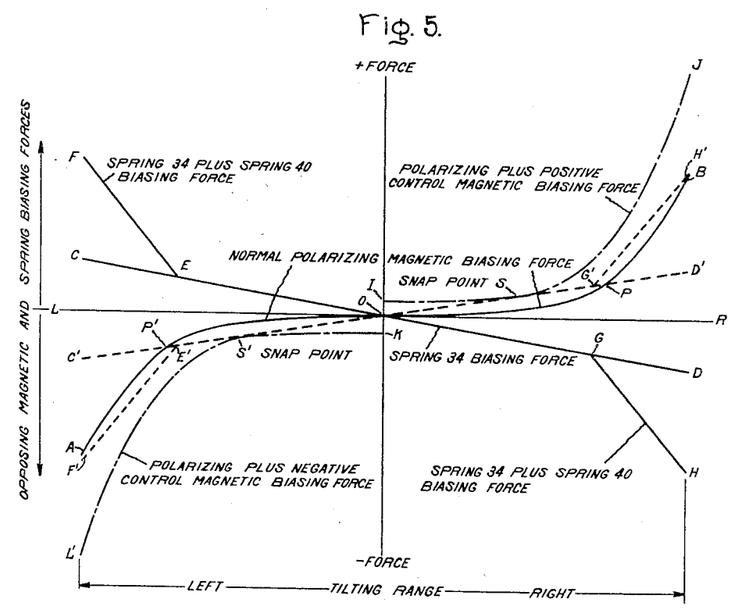
Fig. 5 is a force diagram illustrating schematically the operating relationships between the forces produced by the polarizing flux, the control flux, and the sequential biasing springs in providing snap action movements of the reversely tilting 3-position magnetic member with the member normally biased to return to the central balanced position wherein both contacts of the relay are opened.

As shown in the schematic force diagram of Fig. 5, is is essential that the composite sequential forces exerted by superimposed biasing springs 34 and 40 fit the variable magnetic composite biasing forces produced by the magnetic structure within reasonable limits in order to obtain highly sensitive snap action tilting movement of member 30 to and from each of its three control positions and at the same time provide ample contact pressure for wiping the relay switch contacts closed to resist severe vibration conditions tending to open the contacts. It should be understood however that only typical variable biasing spring forces and variable magnetic biasing forces acting upon the tilting magnetic member 30 are illustrated schematically in this diagram in order to explain the relay snap action operation, but that these forces may be varied considerably in practice to meet varying conditions.

In Fig. 5 the horizontal ordinate LOR represents the limited range of reverse tilting or angular displacement of magnetic member 30 from its zero or central position O in which it is shown in Fig. 1 to the right and to the left so as substantially to close respectively air gaps 33 and 32. The vertical ordinate $F+$OF$-$ represents both positive and negative variations in the opposing spring biasing forces and magnetic biasing force acting on tilting member 30.

The full line curve AOB in Fig. 5 represents the normal polarizing magnetic biasing force (i. e., without any control magnetization of pole 22) that is exerted on magnetic member 30 in case it is mechanically tilted each way from its central position. The shape of the polarizing magnetic biasing force curve AOB will follow substantially a differential inverse square function law since the polarizing flux remains substantially constant due to opposite variation of the two magnetic reluctance air gaps 32 and 33 in series in the circuit. With relatively small gaps in a high permeability polarizing magnetic circuit as shown, preferably operating at or near the peak of the permeability curve to obtain maximum efficiency, the curve AOB is somewhat flat on each side of the vertical axis up to the points indicated as PP'. Thus a limited variation of the air gaps 32 and 33 and corresponding angular movement of the tilting member 30 from the O point can occur before the marked increase in the polarized magnetic biasing force is produced. This enable stabilization of tilting member 30 in its central position to be obtained even under severe vibration conditions with a relatively weak centering spring 34 and thus provides for high relay sensitivity.

The line COD represents the centering biasing force provided by the two halves of spring 34 alone. This force tends to maintain member 30 stabilized in its central position in which it is shown in Fig. 1. For easy comparison with the magnetic biasing curve AOB, the spring biasing force line COD is transferred into its reverse quadrants and shown as the dash line C'OD'. It will be observed that the transferred line C'OD' is of relatively low slope indicating a weak spring and intersects the magnetic biasing curve AOB substantially at the O point and also substantially at the points P and P'. This means that with the control pole 22 unexcited, tilting member 30 can be maintained in stable equilibrium by the predominance of the relatively weak spring 34 alone up to the points PP', but if member 30 is tilted beyond these points, the unbalanced polarizing magnetic biasing force will then rapidly predominate over the centering bias provided by the relatively weak spring 34 alone and continue the tilting of member 30 to close gap 33 with a snap action. It will be understood, however, that to insure accurate control a thin blocking film either of lacquer or suitable nonmagnetic plating is provided to prevent complete closure of the air gap 33. This is also true of gap 32. Hence, tilting member 30 always is stopped a little short of closing the air gaps by such blocking film or other suitable means for preventing complete sealing of the magnetic circuit.

The two straight lines EF and GH represent the total resilient bias provided jointly by the two portions of centering spring 34 and the two portions of contact carrying spring 40 after the respective engagement of contacts 41 and 42 with their cooperating contacts. These lines also are shown transferred for the purpose of easy comparison with the curves representing the magnetic bias. It will be observed that the slope of the total spring force curves E'F' and G'H' is considerably greater than the slope C'OD' of spring 34 alone so that the combined resilient biasing force curve always remains above the polarizing magnetic biasing force curve AOB within the limited tilting range of member 30. Thus with the opposing magnetic and resilient forces related as shown in Fig. 5, the available sole and joint resilient biasing forces will always predominate throughout the entire tilting range over the opposing normal polarizing magnetic biasing force when the control pole 22 is unexcited and thereby normally bias tilting magnetic member 30 to its central stabilized position.

*Snap action magnetic unbalancing operation*

With member 30 polarized and normally biased to its central stabilized position and with the sequential resilient and normal polarizing magnetic biasing forces interrelated as just described, tilting of the magnetic member 30 from its central position is obtained by exciting the control pole 22. Excitation of pole 22 will inherently cumulatively magnetize one of the air gaps 32, 33 and differentially magnetize the other and thereby unbalance the opposing normal magnetic biasing forces exerted on tilting member 30 by the opposite poles 11 and 12. Assuming that air gap 33 is cumulatively magnetized and gap 32 differentially magnetized, then the resultant effective unbalanced magnetic biasing force tends to tilt member 30 to the right or clockwise against the opposing bias of the left hand portion of centering spring 34. In effect, the whole magnetic biasing force curve AOB may be considered as shifting upwardly towards the position indicated by the dash-dot-dash curve IJ in Fig. 5 as pole 22 is gradually excited to a value I. To avoid complications in the diagram only the right hand half of the curve AOB is shown as shifted upwardly.

With the first increment of the assumed excitation of the control pole 22, the tilting member 30 will move slightly to the right until the effective unbalanced magnetic biasing force is counterbalanced by the increase of the centering spring force indicated by the dash line OD'. With each further incremental increase of the assumed excitation of the control pole 22, there will be a continuation of this slight tilting of magnetic member 30 to the right and the counterbalancing of the magnetic and spring biasing forces until point S is reached. At this point the dash-dot-dash shifted magnetic biasing curve IJ becomes substantially equal to and of materially steeper slope than the opposing spring bias OD' and thus without any further increase in excitation of the control pole 22, the tilting of the magnetic member 30 to the right will not only continue but be accelerated due to the increasing difference between the magnetic and spring forces so that an effective snap action is obtained.

At the point G', movable contact 41 will engage with the cooperating contact 47 and the total cumulative spring biasing force of the left hand portion of spring 34 and the left hand portion of spring 40, represented by the dash line G'H', then comes into action. However, it will be seen that the increased magnetic biasing force IJ still exceeds the sum of the two spring biasing forces so that the magnetic member 30 continues at high velocity until the limit of tilting movement is reached at point J. At this point contacts 41 and 47 have been wiped closed with a substantial contact closing pressure represented by the magnetic force J minus the total opposing spring forces represented by H'. Such contact closing and wiping force is resiliently applied by the left hand portion of spring 40 and thus serves to maintain contacts 41 and 47 in wiping engagement even though the relay should be subject to severe vibration conditions.

If now the assumed excitation of the control pole 22 is reduced so that the point J tends to return to the normal polarizing magnetization value B, at this latter point the normal magnetic force B will always become slightly less than the sum of the two biasing spring forces H'. Thereupon the magnetic member 30 will reversely tilt towards its central position with great rapidity since the return tilting movement of member 30 increases the difference between the spring forces and the magnetic force until the central position is reached. The member 30 will thus return from its tilted left-hand contact closing position to its central position at high speed and separate contacts 41, 47 with a snap action since the normal polarizing magnetic biasing force curve AOB is always below the compound spring line G'H' and also the centering spring line OD'.

It will thus be seen that even with a very slow increase in excitation of the control pole 22, the magnetic member 30 will tilt slowly within its central stabilized range up to point S but will then snap the contacts 41 and 47 closed at point G' and the amplified magnetic bias will then build up an appreciable resilient wiping contact pressure to maintain the contacts in the closed position. Likewise, with a slow decrease in excitation of pole 22, the contacts 41 and 47 will remain firmly closed under full wiping contact pressure until the point of zero excitation of pole 22 is reached at which time the contacts 41, 47 will snap open and the tilting magnetic member 30 will return to its stabilized central position to which it is biased. It should be noted that this is all accomplished by varying the excitation of control pole 22 only a relatively slight amount as indicated by the relatively short line OI in the diagram due to the magnetic control force amplifying and deamplifying action automatically provided by the improved tilting relay structure.

In case the control pole 22 is reversely excited so as to cumulatively magnetize the air gap 32 and differentially magnetize the air gap 33, then magnetic member 30 will be tilted counterclockwise in identically the same way as just described. Since the shifted magnetic biasing curve indicated by the dash-dot-dash line KL' will predominate over the centering resilient biasing force curve OC' at the point S', contacts 42 and 49 will be engaged at the point E' with a snap action.

Likewise, the amplified magnetic bias at point L' will predominate materially over the combined resilient spring bias indicated at point F to provide a substantial contact pressure for maintaining the contacts 42 and 49 in resilient wiping engagement. When the reversed excitation of pole 22 is reduced to zero, member 30 will return to its central stabilized position and open contacts 42 and 49 with a snap action.

The value of the counterbiasing forces produced by the two portions of centering spring 34 can be varied by adjusting the stops 35 and 36. Such adjustment will vary the critical values of excitation of the control pole 22 at which snap action will occur. Similarly, adjustment of the contacts 47 and 49 and the resulting pressure produced by the two portions of contact carrying spring 40 will change the value of excitation of the control pole 22 at which the opening of each pair of contacts will occur. Since each of the centering biasing spring adjustments and each of the contact spring adjustments is associated with only one side of the double blade biasing spring 34 and 40, the right and left-hand sides can be separately calibrated for both "pick-up" and "drop-out" of the related contacts at different values of excitation of the control pole 22 without adversely affecting the snap action performance of the relay.

The electrical circuit controlled through contacts 41 and 42 is completed through terminal 46 by means of the flexible connection 45 to the contact carrying spring 40. It will thus be seen that with a predetermined excitation of the control pole 22, one set of the relay switching contacts will be closed while with the opposite excitation of the control pole 22, the opposite set of relay contacts will be closed, thus making it possible to reverse the direction of motion of a reversible motor or other device controlled by the relay.

It has been found in actual test of a relay embodying the improvements of the present invention as just described that an energy change in the excitation of control pole 22 as low as .0004 watt is able to produce a contact pressure of 25 grams with $\frac{1}{32}$ inch wipe which is adequate to directly handle an ordinary temperature regulating or condition modulating control motor without the necessity of any interposed motor controlling contactor, as indicated in Fig. 4.

Figure 6:
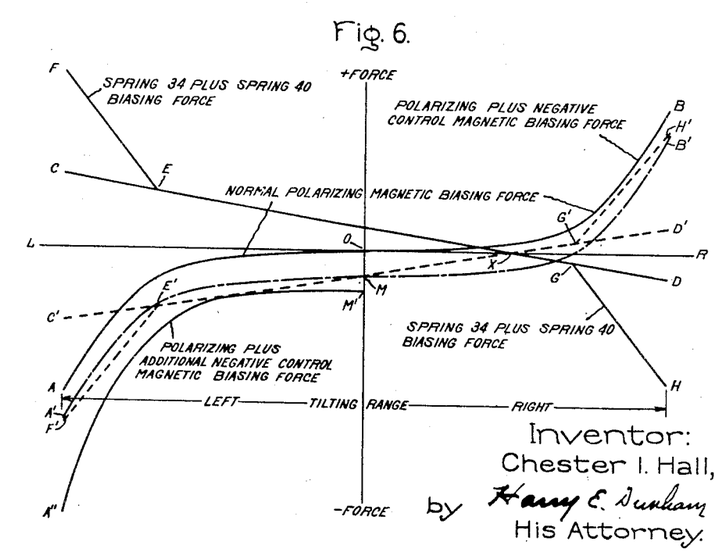
Fig. 6 is a similar force diagram showing how the force relationships are changed when the biasing control is adjusted to normally bias the tilting member to return to one of its tilted positions wherein a corresponding one of the relay circuit controlling contacts is normally biased closed.

Fig. 6 illustrates the opposing resilient and magnetic biasing forces which act on the tilting magnetic member 30 in case the adjustable stops 35 and 36 for the spring 34 are so adjusted as to normally bias one set of the relay contacts, namely contacts 41, 47, closed with no excitation of the control pole 22. This diagram shows that even under such conditions of adjustment the relationship between the resilient and magnetic biasing forces still remains such that snap action of the magnetic member 30 to and from each of its three positions is retained and also that stabilization of the magnetic member 30 in its central position is retained so that the three position relay is still capable of resisting severe vibration conditions. The ability to bias one of the relay contacts closed is desirable in some special cases, particularly where automatic fail safe control is desired.

In Fig. 6 the curve AOB represents the same normal polarizing magnetic bias acting on tilting member 30 due to unbalancing the air gaps 32, 33, as shown in Fig. 5. Thus curve AOB retains the same shape since it depends entirely on the amount of polarizing flux present and the air gap variations which are the same irrespective of the resilient spring adjustment. In order to bias magnetic member 30 so that one set of the relay contacts is normally closed, with control pole 22 unexcited, the stops 35 and 36 are adjusted to shift the resilient biasing curve F'E'G'H' so that the magnetic member 30 will be spring-biased sufficiently away from the point O that the magnetic biasing force represented by the polarizing magnetic biasing curve AOB will automatically predominate over the resilient spring biasing forces represented by curve F'E'G'H', as indicated by the dash line in Fig. 6. Thus, instead of intersecting the axis at the zero point, the centering spring line CD is displaced to the right so as to intersect the abscissa at the point X. Thus the transferred spring biasing curve C'D' is slightly displaced from tangency with the magnetic biasing curve AOB. The contact carrying biasing spring 40 is of course not affected by such displacement of the centering biasing spring 34.

Now in order to bring the magnetic member 30 into its central position when the relay 10 is adjusted as just described for a normally closed set of contacts, a critical value of excitation of the control pole 22 is required which is represented by the value OM. With such magnetization of control pole 22, the normal polarizing magnetization curve AOB is shifted downwardly, as indicated by the dash-dot-dash line A'MB' in Fig. 6, and thus again intersects the force axis at the same point M as the displaced centering biasing curve E'G'. As a result the resilient biasing curve MG'H' will again predominate over the magnetic biasing curve MB' to return the magnetic member 30 with a snap action to its central position. Stability of the magnetic member 30 in its midposition is obtained due to the fact that the slope of the resilient biasing curve is greater than the magnetic biasing curve at their point of intersection M.

In order to cause the magnetic member 30 to further tilt to the left from its central position, a further increase in excitation of the control pole 22 to a value M' is required. With such magnetization of the control pole 22, the magnetic biasing force curve M'A'' will predominate over the combined resilient spring biasing curve MEF'' so as to effect the continued tilting of magnetic member 30 and snap action engagement of the normally open relay contacts 42, 49 with a wiping contact pressure indicated by the force A''—F''.

When the magnetization of control pole 22 is reduced from the value M' to M, magnetic member 30 will return to the central position with a snap action. Likewise, when the excitation of the control pole 22 is reduced from the value M to zero, then magnetic member 30 will tilt from the central position to reclose contacts 41, 47 with a snap action in accordance with its normal bias.

The connection diagram of Fig. 4 shows the improved relay 10 connected to control directly without any intermediate relays the operation of a reversible electric motor 60, which moves through suitable speed reducing gearing 61, the damper 62 controlling the flow of cooling air through a passage indicated by the dotted line 63 in order to provide a desired temperature control of region 64. An improved temperature sensitive element 65 in the form of a resistor having a relatively high negative temperature coefficient is responsive to variations of the temperature in region 64 and is connected to control the energization of magnetizing winding 25a for the control pole 22 of relay 10. In order to provide a followup action the opposing magnetizing winding 25b for the control pole 22 of relay 10 is energized under the control of a variable resistor 67 having a movable contact 68 connected to be moved in accordance with the movements of the damper 62 by motor 60.

Motor 60 is shown as of the ordinary split field type having a forward field winding 70 and a reverse field winding 71 connected to be selectively energized by operation of the tilting magnetic member 30 in closing one or the other sets of relay contacts 41, 47 or 42, 49. Motor 60 and also the several windings of relay 10 are energized from a suitable supply source indicated as the supply lines L1, L2. As shown, the two relay polarizing windings 13, 14 are normally energized in a series circuit through conductors 72, 73 from supply lines L1, L2, preferably with a variable control resistor 74 included in the circuit in order to vary the relay normal polarizing force so as to effect operation of the relay at the peak of the permeability curve of the magnetic structure thereof.

As shown, both sets of contacts of relay 10 are open so it may be assumed that the damper 62 is properly positioned to maintain the temperature in region 64 at the desired value. Under these conditions the relative energization of the two opposing magnetizing windings 25a and 25b is such that these windings neutralize each other. Thus control pole 22 is not excited since the magnetizing effect of winding 25a is neutralized by the opposing magnetizing effect of winding 25b. When the temperature increases in region 64, the temperature sensitive element 65 will respond to decrease its resistance. As a result, the energization of magnetizing winding 25a will be increased since winding 25a is energized in a circuit extending from supply line L2 to conductors 75, 76, winding 25a, conductor 77, temperature sensitive element 65 and conductor 78. Consequently, the magnetizing effect of winding 25a will predominate over the magnetizing effect of the opposing winding 25b and thereby excite control pole 22 so as to close one of the sets of relay contacts with a snap action in the manner previously described. Assuming that contacts 41, 47 are closed, then motor 60 will be energized through a circuit extending from supply line L2, conductor 80, the armature motor 60, and the motor forward field winding 70, conductor 81, contacts 47, 41, resilient contact wiping spring 40, and conductor 82 to the other supply line L1. Thereupon motor 60 operates to move damper 62 in the direction to increase the flow of cooling air to region 64 and thereby reduce the temperature.

As damper 62 is moved, the movable arm 68 of the rebalancing resistor 67 also is moved in a direction to increase the energization of magnetizing winding 25b so as to again neutralize the predominance of winding 25a. When this occurs, the tilting magnetic member 30 of relay 10 will return to its central position, as shown, to open contacts 41, 47 with a snap action in the manner previously described.

In case the temperature in region 64 decreases below the desired value, then the resistance of element 65 will increase, thereby decreasing the energization of winding 25a so that the magnetizing effect of the opposing winding 25b will now predominate. As a result the tilting magnetic member 30 will reversely tilt with a snap action to close relay contacts 42, 49. This will energize motor 60 through conductor 80 and the reverse field winding 71 so as to move both damper 62 and the movable contact 68 of rebalancing resistor 67 in the opposite direction. This serves both to restore the temperature in the region 64 to the desired value and to rebalance the magnetizing windings 25a and 25b so as to neutralize each other and thereby permit the return of magnetic member 30 to its central position.

It will be understood that while the operation of relay 10 in a control system of Fig. 4 has been described on the assumption that tilting magnetic member 30 is biased to its central position, still all of the adjustments of relay 10 previously described may be made in order to regulate and control the particular variations in temperature in region 64 required to effect pickup and dropout of each set of contacts of the relay. Furthermore, it will be understood that the various advantageous features of relay 10 render it readily adaptable for use in various other temperature modulating or condition regulating control service where high sensitivity, adequate contact pressure, freedom from disturbance by severe vibration condition, and ready adjustability of pickup and dropout are desired.

Since the relay also can be adjusted so as to maintain both contacts normally open or either set of contacts normally closed, its field of application is thereby further increased.

What I claim as new and desire to secure by Letters Patent of the United States is:

1. A polarized device having in combination an elongated centrally pivoted reversely tilting magnetic member, a first pair of cumulatively acting sequential biasing members connected to the portion of said magnetic member on one side of the pivot point, a second pair of cumulatively acting sequential biasing members connected to the second portion of said magnetic member on the other side of said central pivot point, a three pole magnetic structure providing a pair of balanced poles laterally opposite the opposite ends of said magnetic member and a central pole laterally adjacent the axis of said magnetic member, a first one of said first pair of biasing members cooperating with a first one of said second pair of biasing members to continuously bias said magnetic member to a predetermined centrally disposed position, the second one of said first pair becoming effective only upon a predetermined movement of said first portion of said magnetic member beyond said centrally disposed position away from its adjacent pole, the second one of said second pair becoming effective only upon a predetermined movement of said second portion of said magnetic member beyond said centrally disposed position away from its adjacent pole, a normally energized winding on each of said balanced poles for oppositely polarizing said poles, and a pair of variably energized opposing windings for oppositely polarizing said central pole to magnetically unbalance said opposite poles and thereby tilt said magnetic member with respect to said structure with a snap action each way from said centrally disposed position.

2. In combination, means providing a polarized magnetic circuit having a stationary polar structure and a centrally pivoted reversely tilting elongated magnetic flux conducting member providing a pair of oppositely variable reluctance air gaps in said circuit, a first pair of cumulatively sequentially acting biasing members connected to a first end portion of said magnetic flux connecting member on one side of said pivot point, a second pair of cumulatively sequentially acting biasing members connected to the other end portion of said magnetic flux conducting member on the other side of said pivot point, a first one of said first pair cooperating with a first one of said second pair continuously to bias said magnetic flux conducting member in a central position, the second one of said first pair becoming effective only upon a predetermined movement of said first end portion beyond said central position in a direction to increase its corresponding air gap, the second one of said second pair becoming effective only upon a predetermined movement of said second end portion beyond said central position in a direction to increase its corresponding air gap, two movable contacts carried respectively by the second ones of said pairs, two fixed contacts positioned respectively in resilient wiping contact relation with said movable contacts, and electromagnetic means for shunting said structure for differentially magnetizing said gaps to control the tilting of said magnetic member, said first pair of sequential biasing members cooperating to effect snap action tilting movement of said magnetic member in one direction to engage the corresponding movable contact with its fixed contact, said second pair of sequentially acting biasing members cooperating to effect snap action tilting movement of said magnetic member in the other direction to engage the corresponding movable contact with its fixed contact.

3. In combination, means providing a polarizized magnetic structure having a pair of opposite poles in alignment and an intermediate pole centrally disposed in alignment therebetween, a reversely tilting dihedral magnetic member having a knife edge central pivot on said intermediate pole to provide a pair of oppositely variable reluctance air gaps between the opposite ends of said member and said opposite poles and thereby magnetically bias said tilting member responsively to unbalance of said air gaps, a first pair of cumulatively acting sequential biasing members connected to said dihedral member on one side of said central pivot, a second pair of cumulatively acting sequential biasing members connected to said dihedral member on the other side of said central pivot, a first one of said first pair cooperating with a first one of said second pair continuously to bias said dihedral member with respect to said opposite poles to tilt to a predetermined central position, the second one of said first pair becoming effective only upon a predetermined movement of the corresponding end of said dihedral member beyond said predetermined central position in a direction to increase the adjacent air gap, the second one of said second pair becoming effective only upon a predetermined movement of the corresponding end of said dihedral member beyond said predetermined central position in a direction to increase the adjacent air gap, and differential means for variably magnetizing said intermediate pole to vary said magnetic bias of said dihedral member and thereby effect the tilting of said member with a snap action to and from each of a pair of other positions.

4. In combination, means providing a polarized magnetic structure having a pair of spaced apart opposite poles and a pole centrally disposed therebetween, a pair of differentially connected exciting windings for said centrally disposed pole, an elongated reversely tilting magnetic member having a central pivot axis and means for pivoting said member adjacent said central pole to provide a pair of oppositely variable air gaps between the opposite ends of said member and said opposite poles to tilt said member with respect to said opposite poles each way from a central position in response to corresponding net excitation of said central pole and thereby magnetically bias said member to a corresponding one or two other positions in response to the resulting unbalance of said gaps, a first pair of cumulatively acting biasing members connected adjacent one end of said magnetic member for variably predominating over said magnetic bias within a limited range of tilting of said magnetic member to produce snap action of said magnetic member to and from one of said other positions in response to a variation of predetermined polarity in the net excitation of said central pole, and a second pair of cumulatively acting biasing members connected adjacent the other end of said magnetic member for variably predominating over said magnetic bias within a limited range of tilting of said magnetic member to produce snap action of said magnetic member to and from the second of said other positions in response to variations of the opposite polarity in the net excitation of said central pole.

5. In combination, means providing a polarized magnetic structure having a pair of spaced apart opposite poles and a pole centrally disposed therebetween, a pair of differentially connected exciting windings for said centrally disposed pole, an elongated reversely tilting magnetic member having a central pivot axis and means for pivoting said member adjacent said central pole to provide a pair of oppositely variable air gaps between the opposite ends of said member and said opposite poles to magnetically bias said member to tilt with respect to said structure from a central position to each of two other positions upon unbalance of said gaps, a first pair of cumulatively acting sequential biasing members associated with a first end of said elongated magnetic member, and a second pair of cumulatively acting sequential biasing members associated with the second end of said elongated magnetic member, a first one of said first pair cooperating with a first one of said second pair continuously to bias said magnetic member to said central position, the second one of said first pair becoming effective only upon a predetermined movement of said first end beyond said central position away from its adjacent pole, the second one of said second pair becoming effective only upon a predetermined movement of said second end beyond said central position away from its adjacent pole, whereby to render the tilting of said magnetic member each way between each of said two other positions and said central position responsive to predetermined variations in the excitation of said central pole.

6. In combination, means providing a polarized magnetic structure having a pair of spaced apart opposite poles and a pole centrally disposed therebetween, a pair of differentially connected excited windings for said centrally disposed pole, a reversely tilting magnetic member having a central pivot axis and means for pivoting said member adjacent said central pole to provide a pair of oppositely variable air gaps between the opposite ends of said member and said opposite poles to tilt said member with respect to said structure from a central position in response to the excitation of said central pole and thereby magnetically bias said member to each of two other positions in response to unbalance of said gaps, a first pair of cumulatively acting biasing members associated with one end of said magnetic member for providing snap action to and from a first one of said other positions, and a second pair of cumulatively acting biasing members associated with the other end of said magnetic member for providing snap action to and from the second of said other positions, a first one of said first pair cooperating with a first one of said second pair for biasing said member to said central position to establish equilibrium of said member in said central position upon a predetermined excitation of said central pole.

7. In combination, a polarized magnetic structure having a balanced pair of opposite poles in diverging alignment and each provided with a polarizing winding and having a central pole disposed symmetrically between said opposite poles and provided with differentially connected windings for variably magnetizing said central pole to magnetically unbalance said opposite poles, a reversely tilting dihedral magnetic member having a central pivot axis and means for pivoting said member on said central pole to provide a pair of oppositely variable air gaps between the opposite ends of said member and said poles to magnetically bias said member to tilt with respect to said structure from a central position to each of two other positions jointly in response to unbalance of said opposite poles and unbalance of said gaps, a first pair of cumulatively sequentially acting biasing members positioned in superimposed relation on the surface of said magnetic member opposite said structure on one side of said central pivot axis to provide snap action to and from a first one of said other positions, a second pair of cumulatively sequentially acting biasing members positioned in superimposed relation on said opposite surface of said magnetic member on the opposite side of said pivot axis to provide snap action to and from the second of said other positions, the biasing member of said first pair closer to said magnetic member cooperating with the biasing member of said second pair closer to said magnetic member to continuously bias said magnetic member towards said central position, the second biasing member of said first pair becoming effective only upon a predetermined tilt of said magnetic member toward said first other position, the second biasing member of said second pair becoming effective only upon a predetermined tilting of said magnetic member toward the second of said other positions, whereby to effect snap action movement of said member to and from said other positions upon corresponding variations in the sense and magnitude of the net magnetization of said central pole.

8. An electromagnetic reversing control apparatus having means providing a polarized magnetic circuit including a stationary polar structure and a centrally pivoted reversely tilting magnetic flux conducting member, said magnetic circuit having opposite magnetic poles aligned in the paths of opposite ends of said member for providing a pair of oppositely variable reluctance air gaps in series with said member in said circuit, a first pair of cumulatively sequentially acting biasing members connected to said magnetic flux conducting member on one side of the pivot point, a second pair of cumulatively sequentially acting biasing members connected to said magnetic flux conducting member on the other side of said pivot point, a first biasing member of said first pair cooperating with a first biasing member of said second pair to bias said magnetic member to a predetermined position with respect to said structure, electromagnetic means including a pair of differentially connected windings for shunting said polarized magnetic circuit adjacent the axis of said magnetic member for magnetizing said gaps in parallel to control the tilting of said magnetic member between two other positions, condition responsive means for controlling the energization of one of said windings, and means including a reversible motor operated under the control of said reversing control apparatus for controlling the energization of the other of said windings.

9. An electromagnetic reversing control apparatus having means providing a polarized magnetic circuit provided with polarizing windings and including a stationary polar structure and a centrally pivoted magnetic flux conducting member reversely tilting between three positions with respect to said structure to provide a pair of oppositely variable reluctance air gaps in series in said circuit at opposite ends of said member, a first pair of cumulatively acting biasing members associated with the portion of said flux conducting member on one side of the pivot point, a second pair of cumulatively acting biasing members associated with the portion of the magnetic flux conducting member on the other side of said pivot, a first biasing member of said first pair cooperating with a first biasing member of said second pair to bias said magnetic flux conducting member to one of said positions, an electromagnet provided with a pair of differentially connected energizing windings shunting said polarized magnetic circuit adjacent the axis of said flux conducting member for differentially magnetizing said gaps in parallel to reversely tilt said flux conducting member between said positions in response to variations in the excitation of said electromagnet, condition responsive means for controlling the energization of one of said windings, and means responsive to the operation of said control apparatus for controlling the energization of the other of said windings.

10. An electromagnetic control apparatus having means providing a polarized magnetic circuit including a stationary polar structure and an elongated centrally pivoted reversely tilting magnetic flux conducting member providing a pair of oppositely variable reluctance air gaps in series in said circuit, a first pair of cumulatively acting sequential biasing members connected in superimposed relation to said magnetic flux conducting member on one side of the pivot point, a second pair of cumulatively acting sequential biasing members connected in superimposed relation to said magnetic flux conducting member on the other side of said pivot point, a first one of said first pair cooperating with a first one of said second pair to bias said magnetic flux conducting member to a predetermined position with respect to said structure, an electromagnet shunting said polarized flux circuit adjacent the axis of said flux conducting member and provided with a pair of opposing magnetizing windings, each for cumulatively magnetizing a corresponding one of said gaps to control the tilting of said magnetic flux conducting member in response to the magnetizing preponderance of said windings, condition responsive means for controlling the energization of one of said windings, and means responsive to the operation of said control apparatus for controlling the energization of the other of said windings.

11. An electromagnetic control apparatus including means providing a polarized magnetic circuit having a stationary polar structure and a centrally reversely tilting magnetic flux conducting member providing a pair of oppositely variable reluctance air gaps in series with said member in said circuit, two pairs of cumulatively acting resilient members for sequentially biasing said member with respect to said structure to control variation of said gaps, one pair connected to said flux conducting member on one side of the pivot point and the other pair connected to said flux conducting member on the other side of said pivot point, electromagnetic means including a pair of differentially connected windings for shunting said polarized flux circuit adjacent the axis of said flux conducting member and thereby differentially magnetizing said gaps to control the tilting of said flux conducting member, condition responsive means for controlling the energization of one of said windings, and means responsive to the operation of said control apparatus for controlling the energization of the other of said windings.

12. An electromagnetic control apparatus comprising means providing a polarized magnetic structure having a pair of opposite poles, an elongated magnetic member conducting flux between said poles and centrally pivoted therebetween for reversely tilting the opposite ends of said member, each towards and away from a corresponding one of said poles, a first pair of cumulatively acting sequential biasing means connected to said magnetic member on one side of the pivot point for controlling the tilting of said member with respect to said poles between a central position and another position, a second pair of cumulatively acting sequential biasing means connected to said magnetic member on the other side of said pivot point for controlling the tilting of said magnetic member with respect to said poles between said central position and a third position, a first biasing means of said first pair cooperating with a first biasing means of said second pair to continuously bias said magnetic member towards said central position, an electromagnet having a pair of differentially connected excitation windings magnetically shunting said structure adjacent the axis of said member for jointly controlling the tilting of said magnetic member between said positions in response to variations in the excitation of said electromagnet, condition responsive means for controlling the energization of one of said windings, and follow-up means responsive to the operation of said control apparatus for controlling the energization of the other of said windings.

13. An electromagnetic reversing control apparatus including means providing a polarized magnetic structure having a balanced pair of opposite poles in spaced apart alignment and a central pole disposed symmetrically therebetween, said central pole having variable magnetizing means including a pair of differentially connected windings for unbalancing said opposite poles, a reversely tilting magnetic member provided with a central pivot axis and means for pivoting said member adjacent said central pole to provide a pair of oppositely variable air gaps between the opposite ends of said member and said opposite poles to magnetically bias said member to tilt from a central position to each of two other positions jointly in response to unbalance of said opposite poles and unbalance of said gaps, condition responsive means for energizing one of said windings for selectively producing an unbalance in said magnetic bias to initiate the tilting of said member in the corresponding direction in response to a predetermined change in said condition, follow-up means responsive to said tilting for energizing the other of said windings, a first pair of cumulatively sequentially acting resilient biasing members connected to said magnetic member on one side of said central pivot axis, and a second pair of cumulatively selectively acting resilient biasing members connected to said magnetic member on the other side of said pivot axis, said pairs of biasing members variably opposing said magnetic bias of said magnetic member to predominately bias said magnetic member to return to a predetermined one of said three positions with respect to said opposite poles from either of the other of said positions when said magnetizing means is ineffective and to tilt selectively to each of said other positions upon corresponding magnetization of said central pole.

14. An electromagnetic reversing control apparatus including means providing a polarized magnetic structure having a balanced pair of spaced apart opposite poles and a pole centrally disposed therebetween, means including a pair of differentially connected windings for variably magnetizing said central pole to magnetically unbalance said opposite poles, a reversely tilting magnetic member having a central pivot axis and means for pivoting said member adjacent said central pole to provide a pair of oppositely variable air gaps between the opposite ends of said member and said opposite poles to magnetically bias said member to tilt with respect to said structure from a central position to each of two other positions in response both to corresponding unbalance of said opposite poles and to corresponding unbalance of said gaps, a first pair of cumulatively acting sequential biasing members connected to said magnetic member on one side of said central pivot axis for predominately opposing said magnetic bias of said magnetic member in response to the unbalance of said gaps to return said magnetic member from one of said other positions to said central position when said opposite poles are balanced, a second pair of cumulatively acting sequential biasing members connected to said magnetic member on the other side of said central pivot axis for predominately opposing said magnetic bias of said magnetic member in response to the unbalance of said gaps to return said magnetic member from the second of the other positions to said central position when said opposite poles are balanced, a condition responsive variable resistor energized in series with one of said differentially connected windings for controlling the flow of electrical current therethrough, and follow-up means including a reversible motor operated under the control of said reversing control apparatus for controlling the flow of electrical current through the other of said windings.

CHESTER I. HALL.

REFERENCES CITED

The following references are of record in the file of this patent:

UNITED STATES PATENTS

| Number | Name | Date |
|---|---|---|
| 754,689 | Pearne et al. | Mar. 15, 1904 |
| 795,432 | Fischer | July 25, 1905 |
| 799,016 | Schwarze | Sept. 5, 1905 |
| 1,222,803 | Ruprecht | Apr. 17, 1917 |
| 1,676,466 | Snavely | July 10, 1928 |
| 1,700,040 | Grob | Jan. 22, 1929 |
| 1,847,339 | Freeman | Mar. 1, 1932 |
| 1,858,267 | Eames | May 17, 1932 |
| 1,901,443 | Garvin | Mar. 14, 1933 |
| 2,120,178 | Hausrath | June 7, 1938 |
| 2,227,351 | Klein | Dec. 31, 1940 |
| 2,254,411 | Ashworth | Sept. 2, 1941 |
| 2,307,155 | Peek, Jr. | Jan. 5, 1943 |
| 2,360,664 | Field | Oct. 17, 1944 |
| 2,404,227 | Hall | July 16, 1946 |
| 2,405,429 | Jewell | Aug. 6, 1946 |